United States Patent
Kim et al.

(10) Patent No.: US 10,628,688 B1
(45) Date of Patent: Apr. 21, 2020

(54) LEARNING METHOD AND LEARNING DEVICE, AND TESTING METHOD AND TESTING DEVICE FOR DETECTING PARKING SPACES BY USING POINT REGRESSION RESULTS AND RELATIONSHIP BETWEEN POINTS TO THEREBY PROVIDE AN AUTO-PARKING SYSTEM

(71) Applicant: STRADVISION, INC., Pohang-si (KR)

(72) Inventors: Kye-Hyeon Kim, Seoul (KR); Yongjoong Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Dongsoo Shin, Suwon-si (KR); Donghun Yeo, Pohang-si (KR); Wooju Ryu, Pohang-si (KR); Myeong-Chun Lee, Pohang-si (KR); Hyungsoo Lee, Seoul (KR); Taewoong Jang, Seoul (KR); Kyungjoong Jeong, Pohang-si (KR); Hongmo Je, Pohang-si (KR); Hojin Cho, Pohang-si (KR)

(73) Assignee: Stadvision, Inc., Pohang-si (KR)

( * ) Notice: Subject to any disclaimer, the term of this patent is extended or adjusted under 35 U.S.C. 154(b) by 0 days.

(21) Appl. No.: 16/731,077

(22) Filed: Dec. 31, 2019

Related U.S. Application Data (60) Provisional application No. 62/798,535, filed on Jan. 30, 2019.

(51) Int. Cl.
*G06K 9/00* (2006.01)
*G06N 3/08* (2006.01)
(Continued)

(52) U.S. Cl.
CPC ....... *G06K 9/00812* (2013.01); *G05D 1/0088* (2013.01); *G06N 3/0418* (2013.01);
(Continued)

(58) Field of Classification Search
CPC ............. G06K 9/00812; G05D 1/0088; G06N 3/0418; G06N 3/084; G08G 1/141
See application file for complete search history.

(56) References Cited

U.S. PATENT DOCUMENTS

| 9,754,173 B2* | 9/2017 | Kim | G06K 9/00798 |
| 2009/0243889 A1* | 10/2009 | Suhr | G06K 9/00812 340/932.2 |

(Continued)

*Primary Examiner* — Utpal D Shah
(74) *Attorney, Agent, or Firm* — Xsensus LLP (57) ABSTRACT

A learning method for detecting unoccupied parking spaces by using probability distributions on decision points of the unoccupied parking spaces and relational linear segment information on relationships among the decision points is provided. And the method includes steps of: (a) a learning device performing (i) a process of instructing a first CNN to apply a first CNN regression operation to a parking circumstance image, to thereby calculate each of one or more estimated probability distributions, and (ii) a process of instructing a second CNN to apply a second CNN regression operation to the parking circumstance image, to thereby generate estimated relational linear segment information; and (b) the learning device instructing a loss layer to perform (i) a process training parameters in the first CNN by performing backpropagation using a first loss, and (ii) a process of training of parameters in the second CNN by performing backpropagation using a second loss.

30 Claims, 4 Drawing Sheets

(51) Int. Cl.
*G06N 3/04* (2006.01)
*G08G 1/14* (2006.01)
*G05D 1/00* (2006.01)

(52) U.S. Cl.
CPC ............ *G06N 3/084* (2013.01); *G08G 1/141* (2013.01); *G05D 2201/0213* (2013.01)

(56) References Cited

U.S. PATENT DOCUMENTS

| | | | |
|---|---|---|---|
| 2017/0177954 A1* | 6/2017 | Micks | G06K 9/209 |
| 2017/0206426 A1* | 7/2017 | Schrier | B60W 50/00 |
| 2017/0294121 A1* | 10/2017 | Jain | G01S 13/91 |
| 2018/0025640 A1* | 1/2018 | Micks | G08G 1/142 340/932.2 |
| 2018/0356492 A1* | 12/2018 | Hamilton | G01S 13/76 |
| 2019/0147610 A1* | 5/2019 | Frossard | G06T 7/70 382/103 |
| 2019/0228658 A1* | 7/2019 | Huang | G06K 9/00812 |
| 2019/0258251 A1* | 8/2019 | Ditty | G05D 1/0088 |
| 2019/0294889 A1* | 9/2019 | Sriram | G06K 9/6219 |
| 2019/0311205 A1* | 10/2019 | Mittal | G01C 21/32 |
| 2019/0323851 A1* | 10/2019 | Liu | G01C 21/005 |
| 2019/0377965 A1* | 12/2019 | Totolos, Jr. | G06K 9/46 |

\* cited by examiner

LEARNING METHOD AND LEARNING DEVICE, AND TESTING METHOD AND TESTING DEVICE FOR DETECTING PARKING SPACES BY USING POINT REGRESSION RESULTS AND RELATIONSHIP BETWEEN POINTS TO THEREBY PROVIDE AN AUTO-PARKING SYSTEM

CROSS REFERENCE OF RELATED APPLICATION

This application claims the benefit of priority to U.S. Provisional Patent Application No. 62/798,535, filed Jan. 30, 2019, the entire contents of which are incorporated herein by reference.

FIELD OF THE DISCLOSURE

The present disclosure relates to a learning method and a learning device for use with an autonomous vehicle; and more particularly, to the learning method and the learning device for detecting parking spaces to provide an auto-parking system, and a testing method and a testing device using the same.

BACKGROUND OF THE DISCLOSURE

Deep Convolution Neural Networks, or Deep CNN is the most core of the remarkable development in the field of Deep Learning. Though the CNN has been employed to solve character recognition problems in 1990s, it is not until recently that the CNN has become widespread in Machine Learning. For example, in 2012, the CNN significantly outperformed its competitors in an annual software contest, the ImageNet Large Scale Visual Recognition Challenge, and won the contest. After that, the CNN has become a very useful tool in the field of machine learning.

Recently, the CNNs are widely used in a field of an autonomous driving. The CNNs may perform an object detection, a semantic segmentation and a free space detection by processing its own inputted image in the field of the autonomous driving.

Even though such CNNs play an important role in the field of the autonomous driving, there are some partial fields of the autonomous driving where the CNNs have not been studied much. One of them is a field of autonomous parking. The field of the autonomous parking is important because, even though a hazardous accident threatening someone's life may not occur often, many accidents causing financial loss to owners of vehicles may occur very often while parking. If CNNs are used for the field of the autonomous parking, it must be much more economical than a prior art using sensors to detect parking spaces, but applying CNNs to the field of the autonomous parking has not been studied very much yet.

SUMMARY OF THE DISCLOSURE

It is an object of the present disclosure to solve all the aforementioned problems.

It is an object of the present disclosure to provide a method for detecting parking spaces by using a point regression result and information on relationship between points, to thereby provide an auto-parking system, which allows drivers to park their own vehicles simply and easily.

It is another object of the present disclosure to provide a method for building a Convolutional Neural Network (CNN) capable of performing point regression.

It is still another object of the present disclosure to provide a method for building a CNN capable of detecting information on relationships between points.

It is still yet another object of the present disclosure to provide a method for integrating the point regression result and the information on the relationships between the points.

In accordance with one aspect of the present disclosure, there is provided a learning method for detecting one or more unoccupied parking spaces by using one or more probability distributions on one or more decision points of the unoccupied parking spaces and relational linear segment information on relationships among the decision points, including steps of: (a) a learning device, if at least one parking circumstance image, including information on the unoccupied parking spaces, is acquired through at least one camera, performing (i) a process of instructing a first Convolutional Neural Network (CNN) to apply at least one first CNN regression operation to the parking circumstance image, to thereby calculate each of one or more estimated probability distributions on each of the decision points, and (ii) a process of instructing a second CNN to apply at least one second CNN regression operation to the parking circumstance image, to thereby generate estimated relational linear segment information on relationships among at least part of the decision points; and (b) the learning device instructing a loss layer to perform (i) a process of generating a first loss by referring to the estimated probability distributions and its corresponding Ground-Truth (GT) probability distributions, and training at least part of parameters in the first CNN by performing backpropagation using the first loss, and (ii) a process of generating a second loss by referring to the estimated relational linear segment information and its corresponding GT relational linear segment information, and training at least part of parameters in the second CNN by performing backpropagation using the second loss.

As one example, before the step of (a), the method further includes a step of: (a0) the learning device instructing an optimization CNN to apply at least one optimization CNN operation to the parking circumstance image with a size of $W_1 \times H_1 \times C_1$, to thereby generate at least one adjusted parking circumstance image with a size of $W_2 \times H_2 \times C_2$, wherein $W_2$ and $H_2$ are smaller than $W_1$ and $H_1$, and $C_2$ is larger than $C_1$, and wherein, at the step of (a), the learning device performs (i) a process of instructing the first CNN to apply the first CNN regression operation to the adjusted parking circumstance image, to thereby calculate the estimated probability distributions, and (ii) a process of instructing the second CNN to apply the second CNN regression operation to the adjusted parking circumstance image, to thereby generate the estimated relational linear segment information.

As one example, in order to apply the first CNN regression operation to the parking circumstance image, the learning device (i) instructs each of one or more first convolutional neurons in at least one first convolutional layer of the first CNN to repeat a process of applying at least one first convolutional operation to its inputted value by using its own parameter and delivering its outputted value to its next first convolutional neuron, to thereby generate a first feature map, and (ii) instructs at least one first output layer in the first CNN to apply at least one first output operation to the first feature map, to thereby generate the estimated probability distributions.

As one example, the learning device instructs the first output layer to generate at least one estimated decision point image including one or more i-th estimated probability distributions on one or more i-th decision points, in its i-th channel, by applying the first output operation, which is at least one Fully-Connected (FC) network operation, to the first feature map, to thereby generate the estimated probability distributions and wherein i is an integer from 1 to 4.

As one example, each of the i-th decision points is selected among vertices in each of the unoccupied parking spaces, wherein one or more specific vertices which are selected as the i-th decision points have at least one i-th locational characteristic in relation to a subject vehicle to be parked autonomously.

As one example, at the step of (a), in order to apply the second CNN regression operation to the parking circumstance image, the learning device (i) instructs each of one or more second convolutional neurons in at least one second convolutional layer of the second CNN to repeat a process of applying at least one second convolutional operation to its inputted value by using its own parameter and delivering its outputted value to its next second convolutional neuron, to thereby generate a second feature map, and (ii) instructs at least one second output layer in the second CNN to apply at least one second output operation to the second feature map, to thereby generate the estimated relational linear segment information.

As one example, the learning device instructs the second output layer to generate at least one estimated relational linear segment image including i-th estimated relational linear segment information on one or more i-th pairs of at least part of the decision points, in its i-th channel, by applying the second output operation, which is at least one Fully-Connected (FC) network operation, to the second feature map, and wherein i is an integer from 1 to 4.

As one example, the i-th pairs are selected among pairs of vertices included in specific linear segments of the unoccupied parking spaces, and wherein the specific linear segments have at least one i-th locational characteristic in relation to a subject vehicle to be parked autonomously.

As one example, before the step (a), the method further includes a step of: (a1) at least one labeler, which interworks with the learning device, performing (i) a process of generating the GT probability distributions by generating each of Gaussian probability distributions whose center is each of the decision points in the parking circumstance image, and (ii) a process of generating the GT relational linear segment information by using information on linear segments corresponding to at least part of pairs of at least part of the decision points.

In accordance with another aspect of the present disclosure, there is provided a testing method for detecting one or more unoccupied parking spaces for testing by using one or more probability distributions for testing on one or more decision points for testing of the unoccupied parking spaces for testing and relational linear segment information on relationships among the decision points for testing, including steps of: (a) on condition that (1) a learning device, if at least one parking circumstance image for training, including information on one or more unoccupied parking spaces for training, is acquired through at least one camera for training, has performed (i) a process of instructing a first Convolutional Neural Network (CNN) to apply at least one first CNN regression operation to the parking circumstance image for training, to thereby calculate each of one or more estimated probability distributions for training on each of decision points for training, and (ii) a process of instructing a second CNN to apply at least one second CNN regression operation to the parking circumstance image for training, to thereby generate estimated relational linear segment information for training on relationships among at least part of the decision points for training; and (2) the learning device has instructed a loss layer to perform (i) a process of generating a first loss by referring to the estimated probability distributions for training and its corresponding Ground-Truth (GT) probability distributions, and training at least part of parameters in the first CNN by performing backpropagation using the first loss, and (ii) a process of generating a second loss by referring to the estimated relational linear segment information for training and its corresponding GT relational linear segment information, and training at least part of parameters in the second CNN by performing backpropagation using the second loss, a testing device performing (i) a process of instructing the first CNN to apply the first CNN regression operation to a parking circumstance image for testing, to thereby calculate each of one or more estimated probability distributions for testing on each of the decision points for testing, and (ii) a process of instructing the second CNN to apply the second CNN regression operation to the parking circumstance image for testing, to thereby generate estimated relational linear segment information for testing on relationships among at least part of the decision points for testing; (b) the testing device performing (i) a process of instructing a first selection layer to generate estimated decision point location information for testing on at least part of the decision points for testing, by referring to the estimated probability distributions for testing, and (ii) a process of instructing a second selection layer to generate estimated linear segment location information for testing on at least part of pairs for testing of at least part of the decision points for testing by referring to the estimated relational linear segment information for testing; and (c) the testing device instructing a pairing layer to detect the unoccupied parking space for testing by referring to the estimated decision point location information for testing and the estimated linear segment location information for testing.

As one example, at the step of (b), the testing device instructs the first selection layer to generate the estimated decision point location information for testing by (i) selecting each of local maxima pixels whose probability of being included in one of the decision points for testing is larger than its surrounding pixels, to thereby select each of specific local maxima pixels whose said probability is larger than a threshold, among the local maxima pixels.

As one example, at the step of (b), the testing device instructs the first selection layer to select each of specific local maxima pixels whose probability of being included in one of the decision points for testing is larger than a threshold, among local maxima pixels whose said probability is larger than its surrounding pixels, to thereby generate the estimated decision point location information for testing.

As one example, at the step of (c), the testing device instructs the pairing layer to (i) virtually generate one or more linear segments corresponding to at least part of the pairs for testing of the decision points for testing by referring to the estimated decision point location information for testing, (ii) select specific linear segments among said linear segments whose relationship information for testing, in relation to the estimated linear segment location information for testing, is in a specific condition, and (iii) determine one or more square spaces corresponding to the specific linear segments as the unoccupied parking spaces for testing.

As one example, before the step of (a), the method further includes a step of: (a0) the testing device instructing an optimization CNN to apply at least one optimization CNN operation to the parking circumstance image for testing with a size of $W_1 \times H_1 \times C_1$, to thereby generate at least one adjusted parking circumstance image for testing with a size of $W_2 \times H_2 \times C_2$, wherein $W_2$ and $H_2$ are smaller than $W_1$ and $H_1$, and $C_2$ is larger than $C_1$, and wherein, at the step of (a), the testing device performs (i) a process of instructing the first CNN to apply the first CNN regression operation to the adjusted parking circumstance image for testing, to thereby calculate the estimated probability distributions for testing, and (ii) a process of instructing the second CNN to apply the second CNN regression operation to the adjusted parking circumstance image for testing, to thereby generate the estimated relational linear segment information for testing.

As one example, the method further includes a step of: (d) the testing device delivering information on the unoccupied parking spaces for testing to an autonomous parking module, to thereby support a subject vehicle for testing to be parked autonomously.

In accordance with still another aspect of the present disclosure, there is provided a learning device for detecting one or more unoccupied parking spaces by using one or more probability distributions on one or more decision points of the unoccupied parking spaces and relational linear segment information on relationships among the decision points, including: at least one memory that stores instructions; and at least one processor configured to execute the instructions to perform processes of: (I) if at least one parking circumstance image, including information on the unoccupied parking spaces, is acquired through at least one camera, performing (i) a process of instructing a first Convolutional Neural Network (CNN) to apply at least one first CNN regression operation to the parking circumstance image, to thereby calculate each of one or more estimated probability distributions on each of the decision points, and (ii) a process of instructing a second CNN to apply at least one second CNN regression operation to the parking circumstance image, to thereby generate estimated relational linear segment information on relationships among at least part of the decision points; and (II) instructing a loss layer to perform (i) a process of generating a first loss by referring to the estimated probability distributions and its corresponding Ground-Truth (GT) probability distributions, and training at least part of parameters in the first CNN by performing backpropagation using the first loss, and (ii) a process of generating a second loss by referring to the estimated relational linear segment information and its corresponding GT relational linear segment information, and training at least part of parameters in the second CNN by performing backpropagation using the second loss.

As one example, the processor, before the process of (I), further performs a process of: (a0) instructing an optimization CNN to apply at least one optimization CNN operation to the parking circumstance image with a size of $W_1 \times H_1 \times C_1$, to thereby generate at least one adjusted parking circumstance image with a size of $W_2 \times H_2 \times C_2$, wherein $W_2$ and $H_2$ are smaller than $W_1$ and $H_1$, and $C_2$ is larger than $C_1$, and wherein, at the process of (I), the processor performs (i) a process of instructing the first CNN to apply the first CNN regression operation to the adjusted parking circumstance image, to thereby calculate the estimated probability distributions, and (ii) a process of instructing the second CNN to apply the second CNN regression operation to the adjusted parking circumstance image, to thereby generate the estimated relational linear segment information.

As one example, at the process of (I), in order to apply the first CNN regression operation to the parking circumstance image, the processor (i) instructs each of one or more first convolutional neurons in at least one first convolutional layer of the first CNN to repeat a process of applying at least one first convolutional operation to its inputted value by using its own parameter and delivering its outputted value to its next first convolutional neuron, to thereby generate a first feature map, and (ii) instructs at least one first output layer in the first CNN to apply at least one first output operation to the first feature map, to thereby generate the estimated probability distributions.

As one example, the processor instructs the first output layer to generate at least one estimated decision point image including one or more i-th estimated probability distributions on one or more i-th decision points, in its i-th channel, by applying the first output operation, which is at least one Fully-Connected (FC) network operation, to the first feature map to thereby generate the estimated probability distributions, and wherein i is an integer from 1 to 4.

As one example, each of the i-th decision points is selected among vertices in each of the unoccupied parking spaces, wherein one or more specific vertices which are selected as the i-th decision points have at least one i-th locational characteristic in relation to a subject vehicle to be parked autonomously.

As one example, at the process of (I), in order to apply the second CNN regression operation to the parking circumstance image, the processor (i) instructs each of one or more second convolutional neurons in at least one second convolutional layer of the second CNN to repeat a process of applying at least one second convolutional operation to its inputted value by using its own parameter and delivering its outputted value to its next second convolutional neuron, to thereby generate a second feature map, and (ii) instructs at least one second output layer in the second CNN to apply at least one second output operation to the second feature map, to thereby generate the estimated relational linear segment information.

As one example, the processor instructs the second output layer to generate at least one estimated relational linear segment image including i-th estimated relational linear segment information on one or more i-th pairs of at least part of the decision points, in its i-th channel, by applying the second output operation, which is at least one Fully-Connected (FC) network operation, to the second feature map, and wherein i is an integer from 1 to 4.

As one example, the i-th pairs are selected among pairs of vertices included in specific linear segments of the unoccupied parking spaces, and wherein the specific linear segments have at least one i-th locational characteristic in relation to a subject vehicle.

As one example, the processor, before the process (I), further performs a process of: (a1) instructing at least one labeler, which interworks with the learning device, to perform (i) a process of generating the GT probability distributions by generating each of Gaussian probability distributions for each of the decision points in the parking circumstance image, and (ii) a process of generating the GT relational linear segment information by using information on linear segments corresponding to at least part of pairs of at least part of the decision points.

In accordance with still yet another aspect of the present disclosure, there is provided a testing device for detecting one or more unoccupied parking spaces for testing by using one or more probability distributions for testing on one or more decision points for testing of the unoccupied parking spaces for testing and relational linear segment information on relationships among the decision points for testing, including: at least one memory that stores instructions; and at least one processor configured to execute the instructions to perform processes of: (I) on condition that (1) a learning device, if at least one parking circumstance image for training, including information on one or more unoccupied parking spaces for training, is acquired through at least one camera for training, performing (i) a process of instructing a first Convolutional Neural Network (CNN) to apply at least one first CNN regression operation to the parking circumstance image for training, to thereby calculate each of one or more estimated probability distributions for training on each of decision points for training, and (ii) a process of instructing a second CNN to apply at least one second CNN regression operation to the parking circumstance image for training, to thereby generate estimated relational linear segment information for training on relationships among at least part of the decision points for training; and (2) the learning device instructing a loss layer to perform (i) a process of generating a first loss by referring to the estimated probability distributions for training and its corresponding Ground-Truth (GT) probability distributions, and training at least part of parameters in the first CNN by performing backpropagation using the first loss, and (ii) a process of generating a second loss by referring to the estimated relational linear segment information for training and its corresponding GT relational linear segment information, and training at least part of parameters in the second CNN by performing backpropagation using the second loss, performing (i) a process of instructing the first CNN to apply the first CNN regression operation to a parking circumstance image for testing, to thereby calculate each of one or more estimated probability distributions for testing on each of the decision points for testing, and (ii) a process of instructing the second CNN to apply the second CNN regression operation to the parking circumstance image for testing, to thereby generate estimated relational linear segment information for testing on relationships among at least part of the decision points for testing; (II) performing (i) a process of instructing a first selection layer to generate estimated decision point location information for testing on at least part of the decision points for testing, by referring to the estimated probability distributions for testing, and (ii) a process of instructing a second selection layer to generate estimated linear segment location information for testing on at least part of pairs for testing of at least part of the decision points for testing by referring to the estimated relational linear segment information for testing; and (III) instructing a pairing layer to detect the unoccupied parking space for testing by referring to the estimated decision point location information for testing and the estimated linear segment location information for testing.

As one example, at the process of (II), the processor instructs the first selection layer to select each of specific local maxima pixels whose probability of being included in one of the decision points for testing is larger than a threshold, among local maxima pixels whose said probability is larger than its surrounding pixels, to thereby generate the estimated decision point location information for testing.

As one example, at the process of (II), the processor instructs the second selection layer to generate the estimated linear segment location information for testing by selecting one or more specific pairs for testing, among said pairs for testing, whose one or more estimated relationship scores for testing are larger than a threshold by referring to the relational linear segment information for testing.

As one example, at the process of (III), the processor instructs the pairing layer to (i) virtually generate one or more linear segments corresponding to at least part of the pairs for testing of the decision points for testing by referring to the estimated decision point location information for testing, (ii) select specific linear segments among said linear segments whose relationship information for testing, in relation to the estimated linear segment location information for testing, is in a specific condition, and (iii) determine one or more square spaces corresponding to the specific linear segments as the unoccupied parking spaces for testing.

As one example, the processor, before the process of (I), further performs a process of: (a0) instructing an optimization CNN to apply at least one optimization CNN operation to the parking circumstance image for testing with a size of $W_1 \times H_1 \times C_1$, to thereby generate at least one adjusted parking circumstance image for testing with a size of $W_2 \times H_2 \times C_2$, wherein $W_2$ and $H_2$ are smaller than $W_1$ and $H_1$, and $C_2$ is larger than $C_1$, and wherein, at the process of (I), the processor performs (i) a process of instructing the first CNN to apply the first CNN regression operation to the adjusted parking circumstance image for testing, to thereby calculate the estimated probability distributions for testing, and (ii) a process of instructing the second CNN to apply the second CNN regression operation to the adjusted parking circumstance image for testing, to thereby generate the estimated relational linear segment information for testing.

As one example, wherein the processor further performs a process of: (IV) delivering information on the unoccupied parking spaces for testing to an autonomous parking module, to thereby support a subject vehicle for testing to be parked autonomously.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

Figure 1:
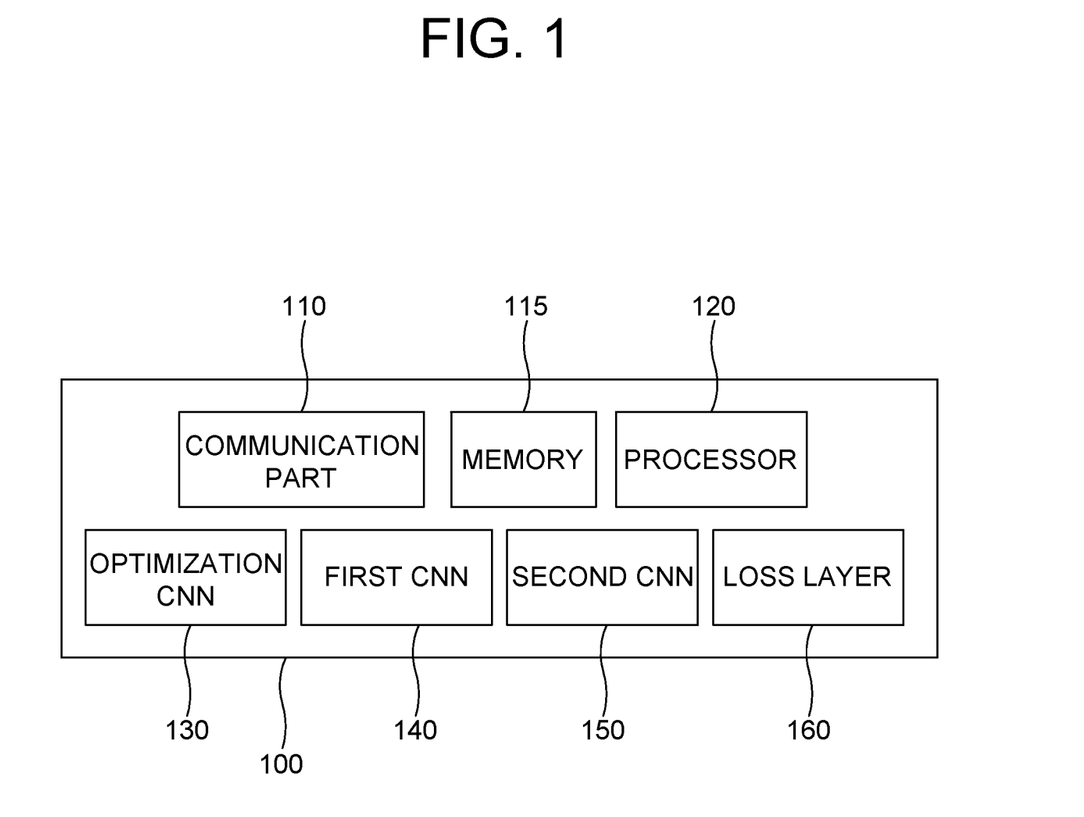
FIG. 1 is a drawing schematically illustrating a configuration of a learning device performing a learning method for detecting parking spaces by using a point regression result and information on relationships between points to thereby provide an auto-parking system in accordance with one example embodiment of the present disclosure.

FIG. 1 is a drawing schematically illustrating a configuration of a learning device performing a learning method for detecting parking spaces by using a point regression result and information on relationships between points to thereby provide an auto-parking system in accordance with one example embodiment of the present disclosure.

By referring to FIG. 1, the learning device 100 may include an optimization Convolutional Neural Network (CNN) 130, a first CNN 140, a second CNN 150 and a loss layer 160 to be described later. Processes of input/output and computations of the optimization CNN 130, the first CNN 140, the second CNN 150 and the loss layer 160 may be respectively performed by at least one communication part 110 and at least one processor 120. However, detailed communication schematics between the communication part 110 and the processor 120 are omitted in FIG. 1. Herein, a memory 115 may have stored various instructions to be described later, and the processor 120 may execute the instructions stored in the memory 115 and may perform processes of the present disclosure by executing the instructions to be disclosed later. Such description of the learning device 100 does not exclude an integrated device including any combination of a processor, a memory, a medium, or any other computing components.

So far the configuration of the learning device 100 performing the learning method for detecting the parking spaces by using the point regression result and the information on the relationships between the points to thereby provide the auto-parking system in accordance with one example embodiment of the present disclosure has been explained. Hereinafter, the learning method itself performed by the learning device 100 will be explained.

Figure 2:
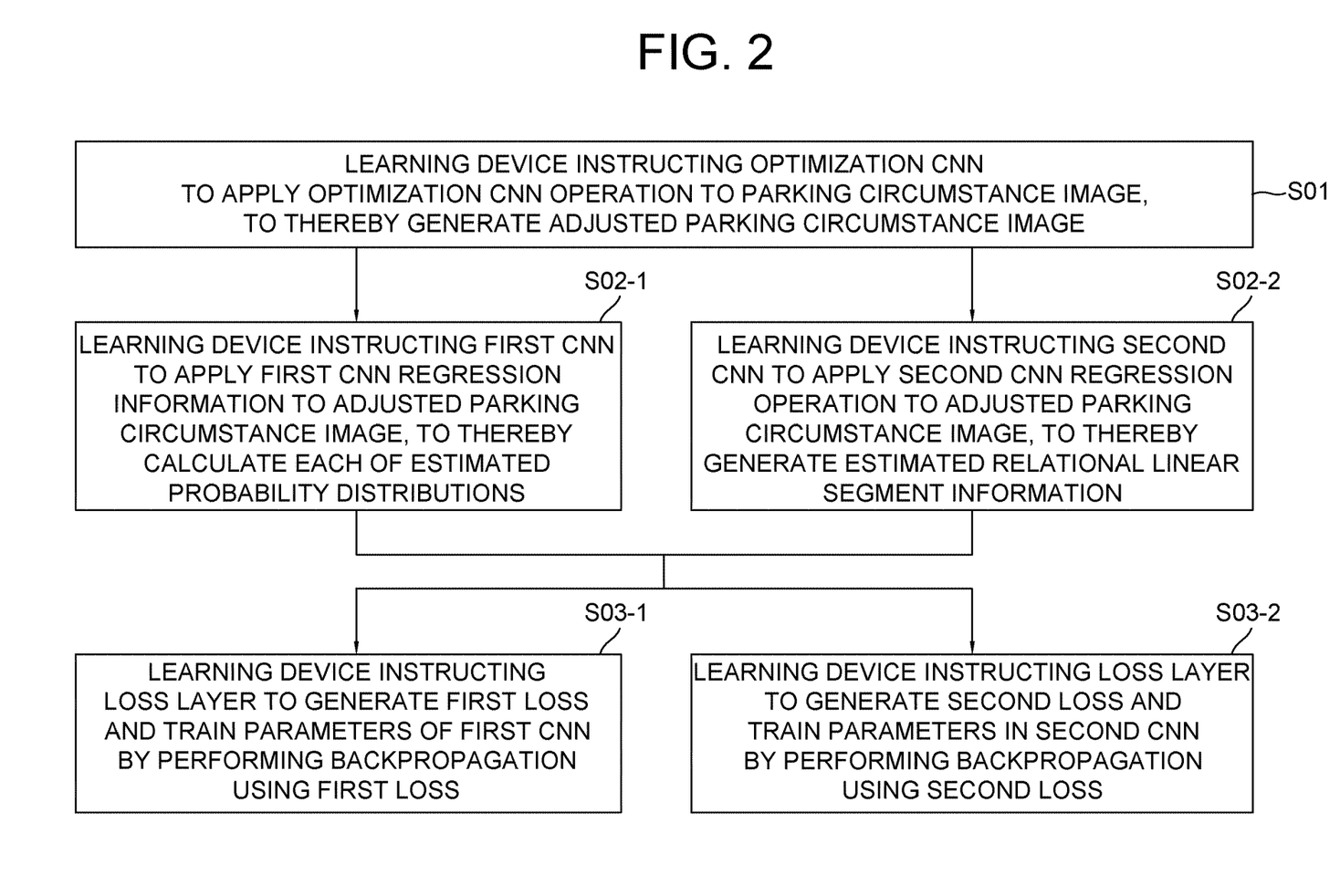
FIG. 2 is a drawing schematically illustrating a flow of the learning method for detecting the parking spaces by using the point regression result and the information on the relationships between the points to thereby provide the auto-parking system in accordance with one example embodiment of the present disclosure.

FIG. 2 is a drawing schematically illustrating a flow of the learning method for detecting the parking spaces by using the point regression result and the information on the relationships between the points to thereby provide the auto-parking system in accordance with one example embodiment of the present disclosure.

By referring to FIG. 2, at a step of S01, the learning device 100, if at least one parking circumstance image is acquired, may instruct the optimization CNN 130 to apply at least one optimization CNN operation to the parking circumstance image, to thereby generate at least one adjusted parking circumstance image. To be explained later, such process is not an essential one. Thereafter, at a step of S02-1, the learning device 100 may instruct the first CNN 140 to apply at least one first CNN regression operation to the adjusted parking circumstance image, to thereby calculate each of one or more estimated probability distributions on decision points to be explained later. Also, in parallel, at a step of S02-2, the learning device 100 may instruct the second CNN 150 to apply at least one second CNN regression operation to the adjusted parking circumstance image, to thereby generate estimated relational linear segment information on relationships among the decision points to be explained later. Then, at a step of S03-1, the learning device 100 may instruct the loss layer 160 to generate a first loss by referring to the estimated probability distributions and its corresponding Ground-Truth (GT) probability distributions, and train at least part of parameters in the first CNN 140 by performing backpropagation using the first loss. In parallel, at a step of S03-2, the learning device 100 may instruct the loss layer 160 to generate a second loss by referring to the estimated relational linear segment information and its corresponding GT relational linear segment information, and train at least part of parameters in the second CNN 150 by performing backpropagation using the second loss.

Below, the learning method of the present disclosure, which has been explained briefly above, will be explained more specifically.

First, the learning device 100 may acquire the parking circumstance image, including information on one or more unoccupied parking spaces, through at least one camera. Herein, as one example, the camera may be one of front camera, side camera or rear camera installed to a subject vehicle interworking with the learning device 100. As another example, it may be one of surveillance cameras in a parking lot, interworking with the learning device 100. In this case, if the learning device has been installed to the subject vehicle, the learning device may acquire the parking circumstance image through a V2X communication scheme.

Thereafter, the learning device 100 may directly input the parking circumstance image to the first CNN 140 and the second CNN 150, or adjust it by using the optimization CNN 130 and then input it to those two. Below, how the optimization CNN 130 works will be explained.

That is, the learning device 100 may instruct the optimization CNN 130 to apply the optimization CNN operation to the parking circumstance image, whose size is $W_1 \times H_1 \times C_1$, to thereby generate at least one adjusted parking circumstance image with a size of $W_2 \times H_2 \times C_2$. Herein, $W_2$ and $H_2$ may be smaller than $W_1$ and $H_1$, and $C_2$ may be larger than $C_1$. To be simple, the optimization CNN 130 may generate a feature map, i.e., the adjusted parking circumstance image, corresponding to the parking circumstance image, and then input it to the first CNN 140 and the second CNN 150. The optimization CNN 130 may be configured by using any of conventional schemes, e.g., VGG16, VGG19, SVNet or ResNet, capable of generating a feature map. And, such optimization CNN 130 may have been pre-trained. By processing the parking circumstance image through the optimization CNN 130, the adjusted parking circumstance image with more sufficient information and smaller size can be inputted to the first CNN 140 and the second CNN 150.

Thereafter, each of the first CNN 140 and the second CNN 150 may apply each of the first CNN regression operation and the second CNN regression operation to the parking circumstance image or its corresponding adjusted parking circumstance image. The first CNN regression operation and the second CNN regression operation will be explained below.

First, in order to apply the first CNN regression operation to the parking circumstance image, the learning device 100 may instruct each of one or more first convolutional neurons in at least one first convolutional layer of the first CNN 140 to repeat a process of applying at least one first convolutional operation to its inputted value by using its own parameter and delivering its outputted value to its next first convolutional neuron, to thereby generate a first feature map. Such processes are similar to those of Feed-Forward Network which is widely used in a field of the Deep Learning, thus a person in the art may easily understand above explanations. Thereafter, the learning device 100 may instruct at least one first output layer in the first CNN 140 to apply at least one first output operation to the first feature map, to thereby generate the estimated probability distributions.

As one example, the first output layer may be configured as a Fully-Connected (FC) network, and accordingly the first output operation may be one of FC network operations. Herein, when the first output layer generates the estimated probability distributions, it may generate at least one estimated decision point image including one or more i-th estimated probability distributions on one or more i-th decision points in its i-th channel.

More specifically, under an assumption that unoccupied parking spaces are square, the decision points may be vertices of the unoccupied parking spaces, and those may be classified into a group of first decision points, a group of second decision points, a group of third decision points and a group of fourth decision points. Herein, the i-th decision points may be vertices whose locational characteristic is an i-th one in relation to the subject vehicle. For example, a first locational characteristic may denote a relational location in each left corner of each linear segment closest from the subject vehicle, and a second locational characteristic may denote a relational location in each right corner of each linear segment closest from the subject vehicle. A third and a fourth locational characteristic may be defined similarly. For example, the third locational characteristic may denote a relational location in each left corner of each linear segment farthest from the subject vehicle, and the fourth locational characteristic may denote a relational location in each right corner of each linear segment farthest from the subject vehicle.

Said each of decision points should be detected separately according to its category so that each of pieces of information on each of the decision points is stored in each of channels corresponding to each of their categories, to achieve better performance in detecting the decision points. That is, a Deep Learning network works better when features of its target outputs are distinguished from those of others and said features of its target outputs are shared among them. Thus, if the decision points are detected in an identical way, it will not be good because those have different features according to their categories, i.e., groups of the first to the fourth decision points. So, the decision points should be treated differently according to their categories.

So far the first CNN regression operation has been explained. Below the second CNN regression operation will be explained.

That is, in order to apply the second CNN regression operation to the parking circumstance image, the learning device 100 may instruct each of one or more second convolutional neurons in at least one second convolutional layer of the second CNN 150 to repeat a process of applying at least one second convolutional operation to its inputted value by using its own parameter and delivering its outputted value to its next second convolutional neuron, to thereby generate a second feature map. Then, the learning device 100 may instruct at least one second output layer in the second CNN 150 to apply at least one second output operation to the second feature map, to thereby generate the estimated relational linear segment information.

Herein, the estimated relational linear segment information may include information on linear segments of the square unoccupied parking spaces, and also may include information on each of estimated relationship scores representing whether each of linear segments connecting each of two vertices belonging to each of pairs of the decision points exists or not. In order to generate such estimated linear segment information, the second output layer may be configured similar to the FC network, and the second output operation may be similar to the FC network operation. And, when generating the estimated relational linear segment information, the second output layer may generate at least one estimated relational linear segment image including i-th estimated relational linear segment information on one or more i-th pairs of at least part of the decision points, in its i-th channel. Each of pieces of the estimated relational linear segment information may be classified into a first one, a second one, a third one and a fourth one, similarly to the decision points. That is, the i-th pairs corresponding to the i-th estimated relational linear segment information may correspond to specific linear segments which have at least one i-th locational characteristic in relation to the subject vehicle. For example, the first pairs may correspond to first linear segments which are closest from the subject vehicle, and the second pairs may correspond to second linear segments on the opposite of the first linear segments. Such classification is similar to that of the decision points, thus more specific explanation is omitted.

Figure 3:
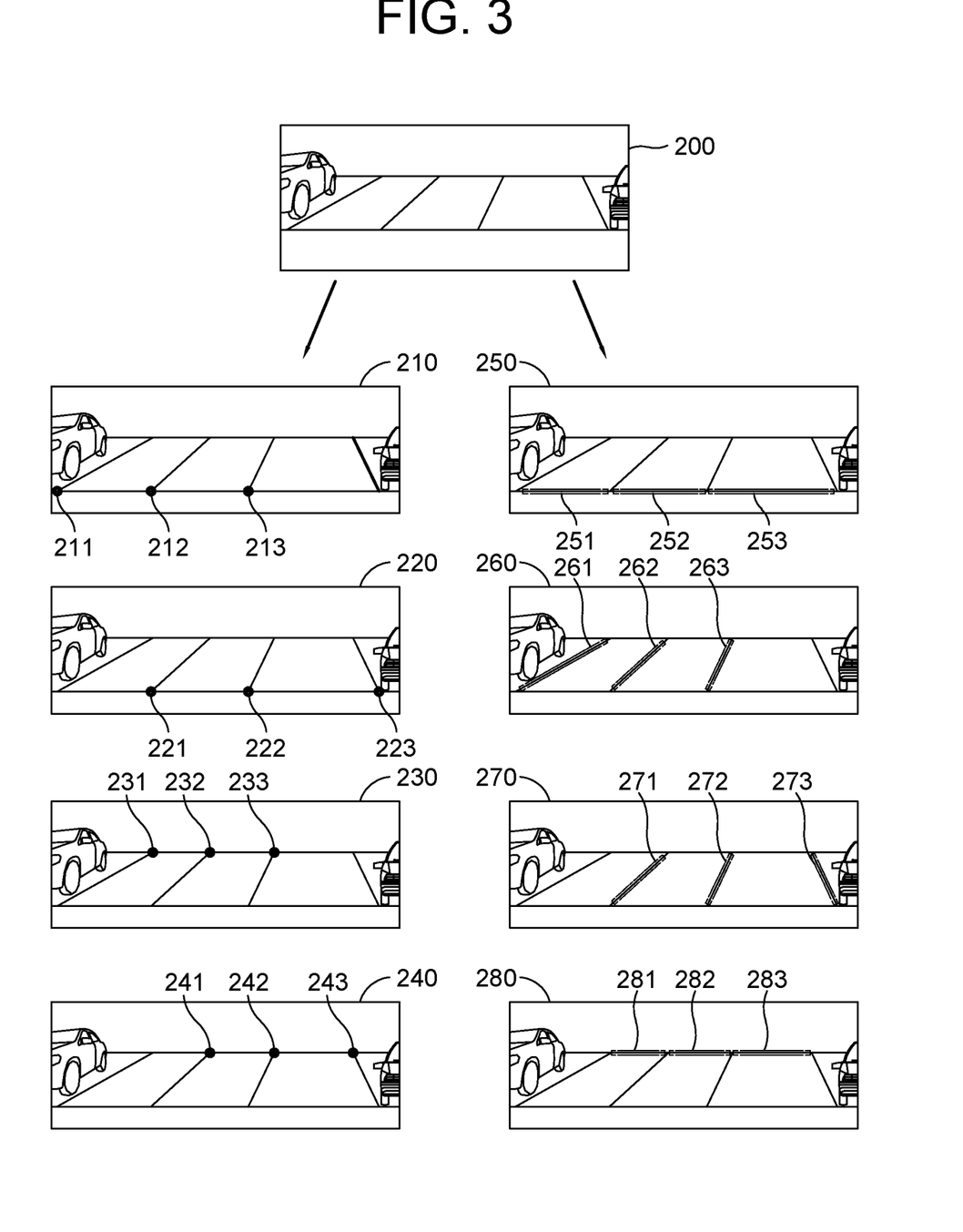
FIG. 3 is a drawing schematically illustrating each of estimated probability distributions, each of pieces of estimated relational linear segment information and their corresponding parking circumstance image to be used for performing the learning method for detecting the parking spaces by using the point regression result and the information on the relationships between the points to thereby provide the auto-parking system in accordance with one example embodiment of the present disclosure.

By referring to FIG. 3, an illustrated example of the estimated probability distributions and the estimated relational linear segment information will be introduced.

FIG. 3 is a drawing schematically illustrating each of estimated probability distributions, each of pieces of estimated relational linear segment information and their corresponding parking circumstance image to be used for performing the learning method for detecting the parking spaces by using the point regression result and the information on the relationships between the points to thereby provide the auto-parking system in accordance with one example embodiment of the present disclosure.

By referring to FIG. 3, the parking circumstance image 200, each of channels of the estimated decision point image 210, 220, 230 and 240, and each of channels of the estimated relational linear segment image 250, 260, 270 and 280 can be seen. In a first channel of the estimated decision point image 210, there can be seen the first estimated probability distributions for the first decision points 211, 212 and 213. Those are all located in a left corner of a linear segment closer from the subject vehicle. Also, in a first channel of the estimated relational linear segment image 250, there can be seen the first estimated relational linear segment information for the first pairs 251, 252 and 253. Those are all located closest from the subject vehicle. Herein, the estimated probability distributions may be seen as simple points at first glance, but those are illustrated as concentric circles, to represent shapes of the Gaussian distributions.

After the estimated probability distributions and the estimated relational linear segment information are generated, by using those and their corresponding GT probability distributions and the GT relational linear segment information, at least part of parameters of the first CNN 140 and the second CNN 150 can be trained. Specifically, the learning device 100 may instruct the loss layer 160 to perform (i) a process of generating the first loss by referring to the estimated probability distributions and its corresponding GT probability distributions, and training at least part of the parameters in the first CNN 140 by performing backpropagation using the first loss, and (ii) a process of generating the second loss by referring to the estimated relational linear segment information and its corresponding GT relational linear segment information, and training at least part of parameters in the second CNN 150 by performing backpropagation using the second loss.

Herein, how the GT probability distributions and the GT relational linear segment information can be acquired will be explained. That is, at least one labeler, which interworks with the learning device 100, may perform (i) a process of generating the GT probability distributions by generating each of Gaussian probability distributions whose center is each of the decision points in the parking circumstance image, and (ii) a process of generating the GT relational linear segment information by using information on linear segments corresponding to at least part of pairs of at least part of the decision points. More specifically, the labeler may classify the decision points into the groups of the first to the fourth decision points, and may generate a GT decision point image by setting each of the GT probability distributions corresponding to each of the first to the fourth decision points in each of its channels. Also, the labeler may find each of linear segments in each of the unoccupied parking spaces of the parking circumstance image, and may set first GT relationship scores of first specific pixels included in the linear segments as 1, and second GT relationship scores of second specific pixels not included in the linear segments as 0, and put those in each of their corresponding channels of a GT relational linear segment image. Such processes can be performed by a computer, or by a human manager using the computer subsidiarily, but a scope of the present disclosure may not be limited thereto.

Below, how the learning device 100, which has been trained by performing said processes, is tested will be shown.

That is, on condition that (1) the learning device 100, if at least one parking circumstance image for training, including information on one or more unoccupied parking spaces for training, is acquired through at least one camera for training, has performed (i) a process of instructing the first CNN 140 to apply the first CNN regression operation to the parking circumstance image for training, to thereby calculate each of one or more estimated probability distributions for training on each of decision points for training, and (ii) a process of instructing the second CNN 150 to apply the second CNN regression operation to the parking circumstance image for training, to thereby generate estimated relational linear segment information for training on relationships among at least part of the decision points for training; and (2) the learning device 100 has instructed the loss layer 160 to perform (i) a process of generating a first loss by referring to the estimated probability distributions for training and its corresponding GT probability distributions, and training at least part of parameters in the first CNN 140 by performing backpropagation using the first loss, and (ii) a process of generating a second loss by referring to the estimated relational linear segment information for training and its corresponding GT relational linear segment information, and training at least part of parameters in the second CNN 150 by performing backpropagation using the second loss, a testing device may perform (i) a process of instructing the first CNN 140 to apply the first CNN regression operation to a parking circumstance image for testing, to thereby calculate each of one or more estimated probability distributions for testing on each of decision points for testing, and (ii) a process of instructing the second CNN 150 to apply the second CNN regression operation to the parking circumstance image for testing, to thereby generate estimated relational linear segment information for testing on relationships among at least part of the decision points for testing.

Thereafter, the testing device may perform (i) a process of instructing a first selection layer to generate estimated decision point location information for testing on at least part of the decision points for testing, by referring to the estimated probability distributions for testing, and (ii) a process of instructing a second selection layer to generate estimated linear segment location information for testing on at least part of pairs for testing of at least part of the decision points for testing by referring to the estimated relational linear segment information for testing.

Then, the testing device may instruct a pairing layer to detect the unoccupied parking space for testing by referring to the estimated decision point location information for testing and the estimated linear segment location information for testing.

Below, how the first selection layer and the second selection layer operate will be shown specifically.

First, the testing device may instruct the first selection layer to generate the estimated decision point location information for testing. Herein, more specifically, the testing device may instruct the first selection layer to (i) acquire information on each of probabilities of each of pixels being included in the decision points for testing, by referring to the estimated probability distributions for testing and (ii) select each of specific local maxima pixels whose probability of being included in one of the decision points for testing is larger than a threshold, among local maxima pixels whose said probability is larger than its surrounding pixels. The surrounding pixels may be pixels located closer than a threshold from their corresponding subject pixel. Herein, these post-processing processes are necessary, because the estimated probability distributions for testing do not directly point out where the decision points for testing are located.

The second selection layer may perform similar post-processing processes similar to those. That is, the testing device may instruct the second selection layer to generate the estimated linear segment location information for testing by selecting one or more specific pairs for testing, among said pairs for testing, whose one or more estimated relationship scores for testing are larger than threshold by referring to the relational linear segment information for testing. To be simple, after filtering out pairs for testing whose estimated relationship scores for testing are relative small so that those are not expected to be connected, the second selection layer may find out where the specific pairs for testing are located.

After the estimated decision point location information for testing and the estimated linear segment location information for testing are acquired, the testing device may instruct the pairing layer to detect the unoccupied parking spaces for testing by using those. Specifically, the pairing layer may (i) virtually generate one or more linear segments corresponding to at least part of the pairs for testing by referring to the estimated decision point location information for testing, (ii) select specific linear segments among said linear segments whose relationship information for testing, in relation to the estimated linear segment location information for testing, is in a specific condition, and (iii) determine one or more square spaces corresponding to the specific linear segments as the unoccupied parking spaces for testing. Herein, the specific condition is a condition that a concordance rate between a subject linear segment and at least one piece of the estimated linear segment location information for testing is larger than a threshold. In order to explain the specific condition more specifically, FIG. 4 will be referred to.

Figure 4:
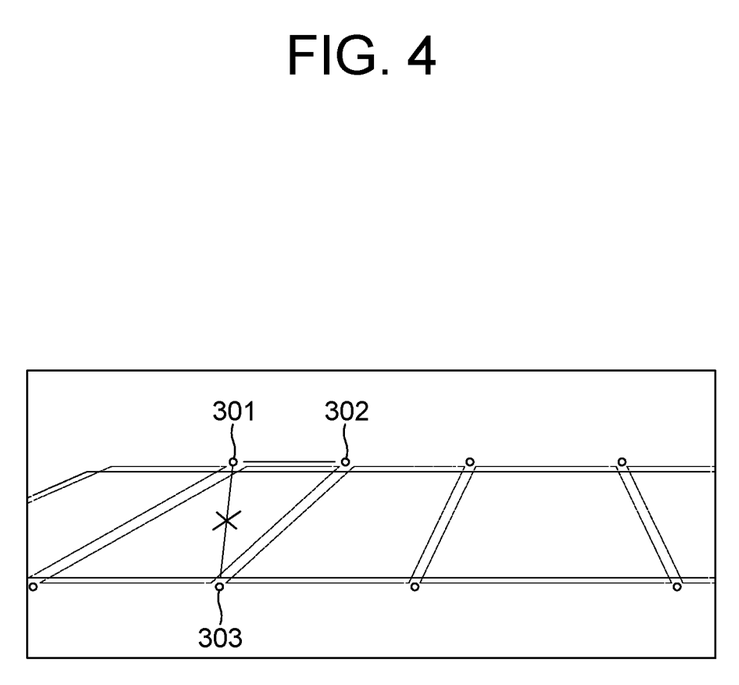
FIG. 4 is a drawing schematically illustrating how a pairing layer is operated to perform the testing method for detecting the parking spaces by using the point regression result and the information on the relationships between the points to thereby provide the auto-parking system in accordance with one example embodiment of the present disclosure.

FIG. 4 is a drawing schematically illustrating how a pairing layer is operated to perform the testing method for detecting the parking spaces by using the point regression result and the information on the relationships between the points to thereby provide the auto-parking system in accordance with one example embodiment of the present disclosure.

By referring to FIG. 4, it can be seen that the pairing layer virtually generated a first linear segment connecting a first decision point for testing 301 and a second decision point for testing 302, but its concordance rate is low. In this case, the first linear segment will be excluded. On the other hand, a second linear segment, connecting the first decision point for testing 301 and a third decision point for testing 303, will not be excluded because its concordance rate is high. In this case, the second linear segment will be determined as a linear segment included in the unoccupied parking spaces for testing.

Below, differentiated features of the method of the present disclosure will be explained.

As prior arts, there have been provided many methods for detecting the unoccupied parking spaces for testing by using image processing schemes. However, accuracies of said methods of the prior arts could not have been guaranteed, because those have used the image processing schemes to directly detect boundaries of the unoccupied parking spaces for testing. Comparing to this, the method of the present disclosure first detects the decision points for testing, which can be detected with relatively high accuracy by using the image processing, and determine some of the virtually generated linear segments linking some of the decision points for testing as boundaries of the unoccupied parking spaces for testing. By performing processes of the present disclosure step by step, the unoccupied parking spaces for testing can be detected with higher accuracy.

After the unoccupied parking spaces for testing are detected as shown above, the testing device may deliver information thereon to an autonomous parking module inter-working with a subject vehicle for testing, to thereby support the subject vehicle for testing to be parked autonomously.

The present disclosure has an effect of providing the method for detecting the parking spaces by using the point regression result and the information on the relationship between the points, to thereby provide the auto-parking system, which allows the drivers to park their own vehicles simply and easily.

The present disclosure has another effect of providing a method for building a CNN capable of performing point regression.

The present disclosure has still another effect of providing a method for building a CNN capable of detecting information on the relationships between points.

The present disclosure has still yet another effect of providing a method for integrating the point regression result and the information on the relationships between the points.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A learning method for detecting one or more unoccupied parking spaces by using one or more probability distributions on one or more decision points of the unoccupied parking spaces and relational linear segment information on relationships among the decision points, comprising steps of:
   (a) a learning device, if at least one parking circumstance image, including information on the unoccupied parking spaces, is acquired through at least one camera, performing (i) a process of instructing a first Convolutional Neural Network (CNN) to apply at least one first CNN regression operation to the parking circumstance image, to thereby calculate each of one or more estimated probability distributions on each of the decision points, and (ii) a process of instructing a second CNN to apply at least one second CNN regression operation to the parking circumstance image, to thereby generate estimated relational linear segment information on relationships among at least part of the decision points; and
   (b) the learning device instructing a loss layer to perform (i) a process of generating a first loss by referring to the estimated probability distributions and its corresponding Ground-Truth (GT) probability distributions, and training at least part of parameters in the first CNN by performing backpropagation using the first loss, and (ii) a process of generating a second loss by referring to the estimated relational linear segment information and its corresponding GT relational linear segment information, and training at least part of parameters in the second CNN by performing backpropagation using the second loss.

2. The method of claim 1, before the step of (a), further comprising a step of:
   (a0) the learning device instructing an optimization CNN to apply at least one optimization CNN operation to the parking circumstance image with a size of $W_1 \times H_1 \times C_1$, to thereby generate at least one adjusted parking circumstance image with a size of $W_2 \times H_2 \times C_2$,
   wherein $W_2$ and $H_2$ are smaller than $W_1$ and $H_1$, and $C_2$ is larger than $C_1$, and
   wherein, at the step of (a), the learning device performs (i) a process of instructing the first CNN to apply the first CNN regression operation to the adjusted parking circumstance image, to thereby calculate the estimated probability distributions, and (ii) a process of instructing the second CNN to apply the second CNN regression operation to the adjusted parking circumstance image, to thereby generate the estimated relational linear segment information.

3. The method of claim 1, wherein, at the step of (a), in order to apply the first CNN regression operation to the parking circumstance image, the learning device (i) instructs each of one or more first convolutional neurons in at least one first convolutional layer of the first CNN to repeat a process of applying at least one first convolutional operation to its inputted value by using its own parameter and delivering its outputted value to its next first convolutional neuron, to thereby generate a first feature map, and (ii) instructs at least one first output layer in the first CNN to apply at least one first output operation to the first feature map, to thereby generate the estimated probability distributions.

4. The method of claim 3, wherein the learning device instructs the first output layer to generate at least one estimated decision point image including one or more i-th estimated probability distributions on one or more i-th decision points, in its i-th channel, by applying the first output operation, which is at least one Fully-Connected (FC) network operation, to the first feature map, to thereby generate the estimated probability distributions, and wherein i is an integer from 1 to 4.

5. The method of claim 4, wherein each of the i-th decision points is selected among vertices in each of the unoccupied parking spaces, wherein one or more specific vertices which are selected as the i-th decision points have at least one i-th locational characteristic in relation to a subject vehicle to be parked autonomously.

6. The method of claim 1, wherein, at the step of (a), in order to apply the second CNN regression operation to the parking circumstance image, the learning device (i) instructs each of one or more second convolutional neurons in at least one second convolutional layer of the second CNN to repeat a process of applying at least one second convolutional operation to its inputted value by using its own parameter and delivering its outputted value to its next second convolutional neuron, to thereby generate a second feature map, and (ii) instructs at least one second output layer in the second CNN to apply at least one second output operation to the second feature map, to thereby generate the estimated relational linear segment information.

7. The method of claim 6, wherein the learning device instructs the second output layer to generate at least one estimated relational linear segment image including i-th estimated relational linear segment information on one or more i-th pairs of at least part of the decision points, in its i-th channel, by applying the second output operation, which is at least one Fully-Connected (FC) network operation, to the second feature map, and wherein i is an integer from 1 to 4.

8. The method of claim 7, wherein the i-th pairs are selected among pairs of vertices included in specific linear segments of the unoccupied parking spaces, and wherein the specific linear segments have at least one i-th locational characteristic in relation to a subject vehicle to be parked autonomously.

9. The method of claim 1, before the step (a), further comprising a step of:
   (a1) at least one labeler, which interworks with the learning device, performing (i) a process of generating the GT probability distributions by generating each of Gaussian probability distributions whose center is each of the decision points in the parking circumstance image, and (ii) a process of generating the GT relational linear segment information by using information on linear segments corresponding to at least part of pairs of at least part of the decision points.

10. A testing method for detecting one or more unoccupied parking spaces for testing by using one or more probability distributions for testing on one or more decision points for testing of the unoccupied parking spaces for testing and relational linear segment information on relationships among the decision points for testing, comprising steps of:

(a) on condition that (1) a learning device, if at least one parking circumstance image for training, including information on one or more unoccupied parking spaces for training, is acquired through at least one camera for training, has performed (i) a process of instructing a first Convolutional Neural Network (CNN) to apply at least one first CNN regression operation to the parking circumstance image for training, to thereby calculate each of one or more estimated probability distributions for training on each of decision points for training, and (ii) a process of instructing a second CNN to apply at least one second CNN regression operation to the parking circumstance image for training, to thereby generate estimated relational linear segment information for training on relationships among at least part of the decision points for training; and (2) the learning device has instructed a loss layer to perform (i) a process of generating a first loss by referring to the estimated probability distributions for training and its corresponding Ground-Truth (GT) probability distributions, and training at least part of parameters in the first CNN by performing backpropagation using the first loss, and (ii) a process of generating a second loss by referring to the estimated relational linear segment information for training and its corresponding GT relational linear segment information, and training at least part of parameters in the second CNN by performing backpropagation using the second loss, a testing device performing (i) a process of instructing the first CNN to apply the first CNN regression operation to a parking circumstance image for testing, to thereby calculate each of one or more estimated probability distributions for testing on each of the decision points for testing, and (ii) a process of instructing the second CNN to apply the second CNN regression operation to the parking circumstance image for testing, to thereby generate estimated relational linear segment information for testing on relationships among at least part of the decision points for testing;

(b) the testing device performing (i) a process of instructing a first selection layer to generate estimated decision point location information for testing on at least part of the decision points for testing, by referring to the estimated probability distributions for testing, and (ii) a process of instructing a second selection layer to generate estimated linear segment location information for testing on at least part of pairs for testing of at least part of the decision points for testing by referring to the estimated relational linear segment information for testing; and (c) the testing device instructing a pairing layer to detect the unoccupied parking space for testing by referring to the estimated decision point location information for testing and the estimated linear segment location information for testing.

11. The method of claim 10, wherein, at the step of (b), the testing device instructs the first selection layer to select each of specific local maxima pixels whose probability of being included in one of the decision points for testing is larger than a threshold, among local maxima pixels whose said probability is larger than its surrounding pixels, to thereby generate the estimated decision point location information for testing.

12. The method of claim 10, wherein, at the step of (b), the testing device instructs the second selection layer to select one or more specific pairs for testing, among said pairs for testing, whose one or more estimated relationship scores for testing are larger than a threshold by referring to the relational linear segment information for testing, to thereby generate the estimated linear segment location information for testing.

13. The method of claim 10, wherein, at the step of (c), the testing device instructs the pairing layer to (i) virtually generate one or more linear segments corresponding to at least part of the pairs for testing of the decision points for testing by referring to the estimated decision point location information for testing, (ii) select specific linear segments among said linear segments whose relationship information for testing, in relation to the estimated linear segment location information for testing, is in a specific condition, and (iii) determine one or more square spaces corresponding to the specific linear segments as the unoccupied parking spaces for testing.

14. The method of claim 10, before the step of (a), further comprising a step of:

(a0) the testing device instructing an optimization CNN to apply at least one optimization CNN operation to the parking circumstance image for testing with a size of $W_1 \times H_1 \times C_1$, to thereby generate at least one adjusted parking circumstance image for testing with a size of $W_2 \times H_2 \times C_2$, wherein $W_2$ and $H_2$ are smaller than $W_1$ and $H_1$, and $C_2$ is larger than $C_1$, and wherein, at the step of (a), the testing device performs (i) a process of instructing the first CNN to apply the first CNN regression operation to the adjusted parking circumstance image for testing, to thereby calculate the estimated probability distributions for testing, and (ii) a process of instructing the second CNN to apply the second CNN regression operation to the adjusted parking circumstance image for testing, to thereby generate the estimated relational linear segment information for testing.

15. The method of claim 10, further comprising a step of:

(d) the testing device delivering information on the unoccupied parking spaces for testing to an autonomous parking module, to thereby support a subject vehicle for testing to be parked autonomously.

16. A learning device for detecting one or more unoccupied parking spaces by using one or more probability distributions on one or more decision points of the unoccupied parking spaces and relational linear segment information on relationships among the decision points, comprising:

at least one memory that stores instructions; and at least one processor configured to execute the instructions to perform processes of: (I) if at least one parking circumstance image, including information on the unoccupied parking spaces, is acquired through at least one camera, performing (i) a process of instructing a first Convolutional Neural Network (CNN) to apply at least one first CNN regression operation to the parking circumstance image, to thereby calculate each of one or more estimated probability distributions on each of the decision points, and (ii) a process of instructing a second CNN to apply at least one second CNN regression operation to the parking circumstance image, to thereby generate estimated relational linear segment information on relationships among at least part of the decision points; and (II) instructing a loss layer to perform (i) a process of generating a first loss by referring to the estimated probability distributions and its corresponding Ground-Truth (GT) probability distributions, and training at least part of parameters in the first CNN by performing backpropagation using the first loss, and (ii) a process of generating a second loss by referring to the estimated relational linear segment information and its corresponding GT relational linear segment information, and training at least part of parameters in the second CNN by performing backpropagation using the second loss.

17. The device of claim 16, wherein the processor, before the process of (I), further performs a process of:

(I-0) instructing an optimization CNN to apply at least one optimization CNN operation to the parking circumstance image with a size of $W_1 \times H_1 \times C_1$, to thereby generate at least one adjusted parking circumstance image with a size of $W_2 \times H_2 \times C_2$, wherein $W_2$ and $H_2$ are smaller than $W_1$ and $H_1$, and $C_2$ is larger than $C_1$, and wherein, at the process of (I), the processor performs (i) a process of instructing the first CNN to apply the first CNN regression operation to the adjusted parking circumstance image, to thereby calculate the estimated probability distributions, and (ii) a process of instructing the second CNN to apply the second CNN regression operation to the adjusted parking circumstance image, to thereby generate the estimated relational linear segment information.

18. The device of claim 16, wherein, at the process of (I), in order to apply the first CNN regression operation to the parking circumstance image, the processor (i) instructs each of one or more first convolutional neurons in at least one first convolutional layer of the first CNN to repeat a process of applying at least one first convolutional operation to its inputted value by using its own parameter and delivering its outputted value to its next first convolutional neuron, to thereby generate a first feature map, and (ii) instructs at least one first output layer in the first CNN to apply at least one first output operation to the first feature map, to thereby generate the estimated probability distributions.

19. The device of claim 18, wherein the processor instructs the first output layer to generate at least one estimated decision point image including one or more i-th estimated probability distributions on one or more i-th decision points, in its i-th channel, by applying the first output operation, which is at least one Fully-Connected (FC) network operation, to the first feature map, to thereby generate the estimated probability distributions and wherein i is an integer from 1 to 4.

20. The device of claim 19, wherein each of the i-th decision points is selected among vertices in each of the unoccupied parking spaces, wherein one or more specific vertices which are selected as the i-th decision points have at least one i-th locational characteristic in relation to a subject vehicle to be parked autonomously.

21. The device of claim 16, wherein, at the process of (I), in order to apply the second CNN regression operation to the parking circumstance image, the processor (i) instructs each of one or more second convolutional neurons in at least one second convolutional layer of the second CNN to repeat a process of applying at least one second convolutional operation to its inputted value by using its own parameter and delivering its outputted value to its next second convolutional neuron, to thereby generate a second feature map, and (ii) instructs at least one second output layer in the second CNN to apply at least one second output operation to the second feature map, to thereby generate the estimated relational linear segment information.

22. The device of claim 21, wherein the processor instructs the second output layer to generate at least one estimated relational linear segment image including i-th estimated relational linear segment information on one or more i-th pairs of at least part of the decision points, in its i-th channel, by applying the second output operation, which is at least one Fully-Connected (FC) network operation, to the second feature map, and wherein i is an integer from 1 to 4.

23. The device of claim 22, wherein the i-th pairs are selected among pairs of vertices included in specific linear segments of the unoccupied parking spaces, and wherein the specific linear segments have at least one i-th locational characteristic in relation to a subject vehicle to be parked autonomously.

24. The device of claim 16, wherein the processor, before the process (I), further performs a process of:

(a1) instructing at least one labeler, which interworks with the learning device, to perform (i) a process of generating the GT probability distributions by generating each of Gaussian probability distributions whose center is each of the decision points in the parking circumstance image, and (ii) a process of generating the GT relational linear segment information by using information on linear segments corresponding to at least part of pairs of at least part of the decision points.

25. A testing device for detecting one or more unoccupied parking spaces for testing by using one or more probability distributions for testing on one or more decision points for testing of the unoccupied parking spaces for testing and relational linear segment information on relationships among the decision points for testing, comprising:

at least one memory that stores instructions; and at least one processor configured to execute the instructions to perform processes of: (I) on condition that (1) a learning device, if at least one parking circumstance image for training, including information on one or more unoccupied parking spaces for training, is acquired through at least one camera for training, has performed (i) a process of instructing a first Convolutional Neural Network (CNN) to apply at least one first CNN regression operation to the parking circumstance image for training, to thereby calculate each of one or more estimated probability distributions for training on each of decision points for training, and (ii) a process of instructing a second CNN to apply at least one second CNN regression operation to the parking circumstance image for training, to thereby generate estimated relational linear segment information for training on relationships among at least part of the decision points for training; and (2) the learning device has instructed a loss layer to perform (i) a process of generating a first loss by referring to the estimated probability distributions for training and its corresponding Ground-Truth (GT) probability distributions, and training at least part of parameters in the first CNN by performing backpropagation using the first loss, and (ii) a process of generating a second loss by referring to the estimated relational linear segment information for training and its corresponding GT relational linear segment information, and training at least part of parameters in the second CNN by performing backpropagation using the second loss, performing (i) a process of instructing the first CNN to apply the first CNN regression operation to a parking circumstance image for testing, to thereby calculate each of one or more estimated probability distributions for testing on each of the decision points for testing, and (ii) a process of instructing the second CNN to apply the second CNN regression operation to the parking circumstance image for testing, to thereby generate estimated relational linear segment information for testing on relationships among at least part of the decision points for testing; (II) performing (i) a process of instructing a first selection layer to generate estimated decision point location information for testing on at least part of the decision points for testing, by referring to the estimated probability distributions for testing, and (ii) a process of instructing a second selection layer to generate estimated linear segment location information for testing on at least part of pairs for testing of at least part of the decision points for testing by referring to the estimated relational linear segment information for testing; and (III) instructing a pairing layer to detect the unoccupied parking space for testing by referring to the estimated decision point location information for testing and the estimated linear segment location information for testing.

26. The device of claim 25, wherein, at the process of (II), the processor instructs the first selection layer to select each of specific local maxima pixels whose probability of being included in one of the decision points for testing is larger than a threshold, among local maxima pixels whose said probability is larger than its surrounding pixels, to thereby generate the estimated decision point location information for testing.

27. The device of claim 25, wherein, at the process of (II), the processor instructs the second selection layer to select one or more specific pairs for testing, among said pairs for testing, whose one or more estimated relationship scores for testing are larger than a threshold by referring to the relational linear segment information for testing, to thereby generate the estimated linear segment location information for testing.

28. The device of claim 25, wherein, at the process of (III), the processor instructs the pairing layer to (i) virtually generate one or more linear segments corresponding to at least part of the pairs for testing of the decision points for testing by referring to the estimated decision point location information for testing, (ii) select specific linear segments among said linear segments whose relationship information for testing, in relation to the estimated linear segment location information for testing, is in a specific condition, and (iii) determine one or more square spaces corresponding to the specific linear segments as the unoccupied parking spaces for testing.

29. The device of claim 25, wherein the processor, before the process of (I), further performs a process of:
(I-0) instructing an optimization CNN to apply at least one optimization CNN operation to the parking circumstance image for testing with a size of $W_1 \times H_1 \times C_1$, to thereby generate at least one adjusted parking circumstance image for testing with a size of $W_2 \times H_2 \times C_2$,
wherein $W_2$ and $H_2$ are smaller than $W_1$ and $H_1$, and $C_2$ is larger than $C_1$, and
wherein, at the process of (I), the processor performs (i) a process of instructing the first CNN to apply the first CNN regression operation to the adjusted parking circumstance image for testing, to thereby calculate the estimated probability distributions for testing, and (ii) a process of instructing the second CNN to apply the second CNN regression operation to the adjusted parking circumstance image for testing, to thereby generate the estimated relational linear segment information for testing.

30. The device of claim 25, wherein the processor further performs a process of:
(IV) delivering information on the unoccupied parking spaces for testing to an autonomous parking module, to thereby support a subject vehicle for testing to be parked autonomously.

\* \* \* \* \*